(12) United States Patent
Bell et al.

(10) Patent No.: US 9,563,492 B2
(45) Date of Patent: Feb. 7, 2017

(54) SERVICE DIAGNOSTIC TROUBLE CODE SEQUENCER AND METHOD

(71) Applicant: DEERE & COMPANY, Moline, IL (US)

(72) Inventors: Joseph A Bell, Fairbank, IA (US); Curtis Paul Ritter, Waterloo, IA (US); Kelly R Carpenter, Cedar Falls, IA (US); Brigham R Shamrell, Cedar Falls, IA (US); Mark A Friedrich, Cedar Falls, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 14/593,400

(22) Filed: Jan. 9, 2015

(65) Prior Publication Data

US 2016/0203657 A1    Jul. 14, 2016

(51) Int. Cl.
*G06F 11/07* (2006.01)
*G05B 23/02* (2006.01)
*G07C 5/08* (2006.01)

(52) U.S. Cl.
CPC ....... *G06F 11/0739* (2013.01); *G05B 23/0272* (2013.01); *G06F 11/079* (2013.01); *G07C 5/0808* (2013.01)

(58) Field of Classification Search
CPC ...... G07C 5/0808; G06F 1/079; G06F 1/0739; G05B 23/0272
See application file for complete search history.

(56) References Cited

U.S. PATENT DOCUMENTS

| 5,491,631 | A | 2/1996 | Shirane et al. |
| 6,574,537 | B2 | 6/2003 | Kipersztok |
| 7,379,846 | B1 | 5/2008 | Williams et al. |
| 8,428,813 | B2 | 4/2013 | Gilbert |
| 2011/0118932 | A1 | 5/2011 | Singh et al. |
| 2011/0224866 | A1* | 9/2011 | Chen .................... G07C 5/0808 701/31.4 |
| 2012/0259505 | A1 | 10/2012 | Turban et al. |
| 2014/0288761 | A1* | 9/2014 | Butler .................. G07C 5/0816 701/29.6 |
| 2015/0073649 | A1* | 3/2015 | Kelly, III ............... G07C 5/008 701/31.4 |
| 2015/0105972 | A1* | 4/2015 | Madison ................ G07C 5/085 701/33.2 |

OTHER PUBLICATIONS

European Patent Office, Extended European Search Report in Application No. 15200084.0, dated May 30, 2016.

* cited by examiner

*Primary Examiner* — Aaron L Troost
(74) *Attorney, Agent, or Firm* — Lorenz & Kopf, LLP

(57) ABSTRACT

A service diagnostic trouble code sequencer and method is disclosed that includes receiving multiple diagnostic trouble codes (DTCs), determining which DTCs to diagnose first, and recommending which DTC(s) to diagnose first. The sequencer can recommend a category of DTCs to diagnose first, where the category of DTCs includes one or more DTCs. The sequencer can prioritize the DTCs in the category of DTCs. The sequencer can separate the DTCs into multiple categories of DTCs, and prioritize the multiple categories of DTCs. The sequencer can prioritize the DTCs in an ordered category of the multiple categories of DTCs. The sequencer can receive the plurality of DTCs locally or remotely over a network. The sequencer can output the one or more DTCs to diagnose first locally or remotely over a network. The sequencer can be resident on the machine generating the DTCs.

12 Claims, 3 Drawing Sheets

SERVICE DIAGNOSTIC TROUBLE CODE SEQUENCER AND METHOD

FIELD OF THE DISCLOSURE

The present disclosure relates to electronic service tools, and more particularly to a system and method for prioritizing multiple diagnostic codes generated by an electronic service tool.

BACKGROUND

Complex systems such as an electronically controlled diesel engine typically utilize diagnostic trouble codes (DTCs), failure mode indicators (FMIs), suspect parameter numbers (SPNs), and/or other notifications to assist a service technician in diagnosing a problem with the system. DTCs will be used generally to encompass these various notifications, including for example failure, fault and/or error codes. One failure mode will often result in multiple DTCs. For example, a problem with a regulated sensor voltage supply shared by several sensors may result in a voltage out of range DTC for each sensor as well as a DTC indicating a problem with the regulated voltage supply. The sensor voltage out of range DTCs are symptoms of the root cause which is a problem with the regulated voltage supply. The service technician makes the decision on which DTC to diagnose first when there are multiple DTCs present. If the technician begins diagnosing the system by troubleshooting one of the symptom DTCs instead of the root cause DTC, the time and effort, and possibly cost, required to diagnose the system will be increased.

In another example, modeled or virtual sensors typically use information from physical or real sensors to calculate virtual sensor data. A problem with a physical sensor which is used in the calculation of a virtual sensor can result in a DTC for the virtual sensor along with a DTC for the physical sensor. Without engineering-level information, the interaction between physical sensors and virtual sensors would likely not be evident to a service technician. Therefore, the technician may start diagnosing the DTC for the virtual sensor before diagnosing the root cause which is the DTC for the physical sensor.

In addition to electrical issues, mechanical problems can result in multiple DTCs. For example, diesel engine fuel system pressure sensors are typically located in the low-pressure fuel supply system and the high-pressure (i.e. common rail) system. A restricted fuel filter can cause DTCs for both the low-pressure and high-pressure fuel systems. A DTC for the low-pressure fuel system could become active indicating a problem has been detected, and then at a later time the DTC for the high-pressure fuel system could become active. However, both DTCs for the low-pressure and high-pressure fuel systems could be active when the technician begins diagnosing the problems. An inexperienced technician may begin the diagnosis by troubleshooting the active high-pressure fuel system DTC and ignore the previously active low-pressure fuel system DTC, leading to needless replacement of expensive components.

Some system manuals provide service diagnostic procedures with troubleshooting sequence lists for each DTC diagnostic procedure. This static list requires a technician to compare the list of DTCs to be diagnosed first with the current list of active or previously active DTCs on the machine. There is no recommendation in the service information providing the technician information on where to start when there are several DTCs present on the same machine.

Some manufacturers have on-line tools that provide a technician with a recommendation for a multiple DTC diagnostic sequence. However, these tools require the technician to manually enter each DTC present on the machine into the on-line tool and do not appear to be application specific. Other systems provide a process of generating test sequences to diagnose a problem, but not a means of prioritizing which DTC to diagnose first.

It would be desirable to have a system that processes multiple DTCs for an application and provides a prioritized and targeted list for a technician regarding which DTC is likely indicating the root cause problem for the application, thus reducing diagnostic time and cost.

SUMMARY

A service diagnostic trouble code sequencer is disclosed that includes a diagnostic trouble code input, a processor and a recommendation output. The diagnostic trouble code input receives a plurality of diagnostic trouble codes (DTCs). The processor determines which of the plurality of DTCs to diagnose first. The recommendation output outputs one or more of the plurality of DTCs to diagnose first as determined by the processor. The diagnostic trouble code input can receive the plurality of DTCs from an electronic control unit of a machine. The plurality of DTCs can include active DTCs and previously active DTCs.

The processor can determine a first category of DTCs to diagnose, and the recommendation output can output the first category of DTCs to diagnose; where the first category of DTCs to diagnose includes one or more DTCs of the plurality of DTCs. The processor can prioritize the DTCs in the first category of DTCs to diagnose, and the recommendation output can output a prioritized list of the DTCs in the first category of DTCs to diagnose. When multiple DTCs in the first category of DTCs to diagnose are for a common path with flow from upstream to downstream, the processor can prioritize the DTCs in the first category of DTCs to diagnose from upstream failure DTCs to downstream failure DTCs.

The processor can separate the plurality of DTCs into multiple categories of DTCs, and prioritize the multiple categories of DTCs; and the recommendation output can output a prioritized list of the multiple categories of DTCs. The processor can prioritize the DTCs in an ordered category of the multiple categories of DTCs; and for the ordered category, the recommendation output can output the prioritized list of DTCs in the ordered category.

The diagnostic trouble code input can receive the plurality of DTCs locally or remotely over a network. The recommendation output can output the one or more DTCs to diagnose first locally or remotely over a network. The service diagnostic trouble code sequencer can be resident on the machine generating the plurality of DTCs.

A service diagnostic trouble code sequencing method is disclosed that includes receiving a plurality of diagnostic trouble codes (DTCs); determining which of the plurality of DTCs to diagnose first; and recommending one or more of the plurality of DTCs to diagnose first. The determining step can include determining a first category of DTCs to diagnose, where the first category of DTCs to diagnose includes one or more DTCs; and the recommending step can include outputting the one or more DTCs in the first category of DTCs to diagnose. The determining step can also include prioritizing the one or more DTCs in the first category of DTCs to diagnose; and the recommending step can also include outputting a prioritized list of the one or more DTCs in the first category of DTCs to diagnose. When multiple DTCs in the first category of DTCs to diagnose are for a common path with flow from upstream to downstream, the determining step can include prioritizing the multiple DTCs from upstream failure DTCs to downstream failure DTCs.

The determining step can include separating the plurality of DTCs into multiple categories of DTCs, and prioritizing the multiple categories of DTCs; and the recommending step can include outputting a prioritized list of the multiple categories of DTCs. The determining step can also include prioritizing the DTCs in an ordered category of the multiple categories of DTCs; and for the ordered category, the recommending step can include outputting the prioritized list of DTCs in the ordered category.

The service diagnostic trouble code sequencing method can include receiving the plurality of DTCs locally or remotely over a network. The service diagnostic trouble code sequencing method can include outputting the one or more DTCs to diagnose first locally or remotely over a network. The service diagnostic trouble code sequencing method can include receiving the plurality of DTCs locally, and sending the one or more DTCs to diagnose first remotely over a network.

The above and other features will become apparent from the following description and the attached drawings.

BRIEF DESCRIPTION OF THE DRAWINGS

The detailed description of the drawing refers to the accompanying figures in which.

DETAILED DESCRIPTION

Figure 1A:
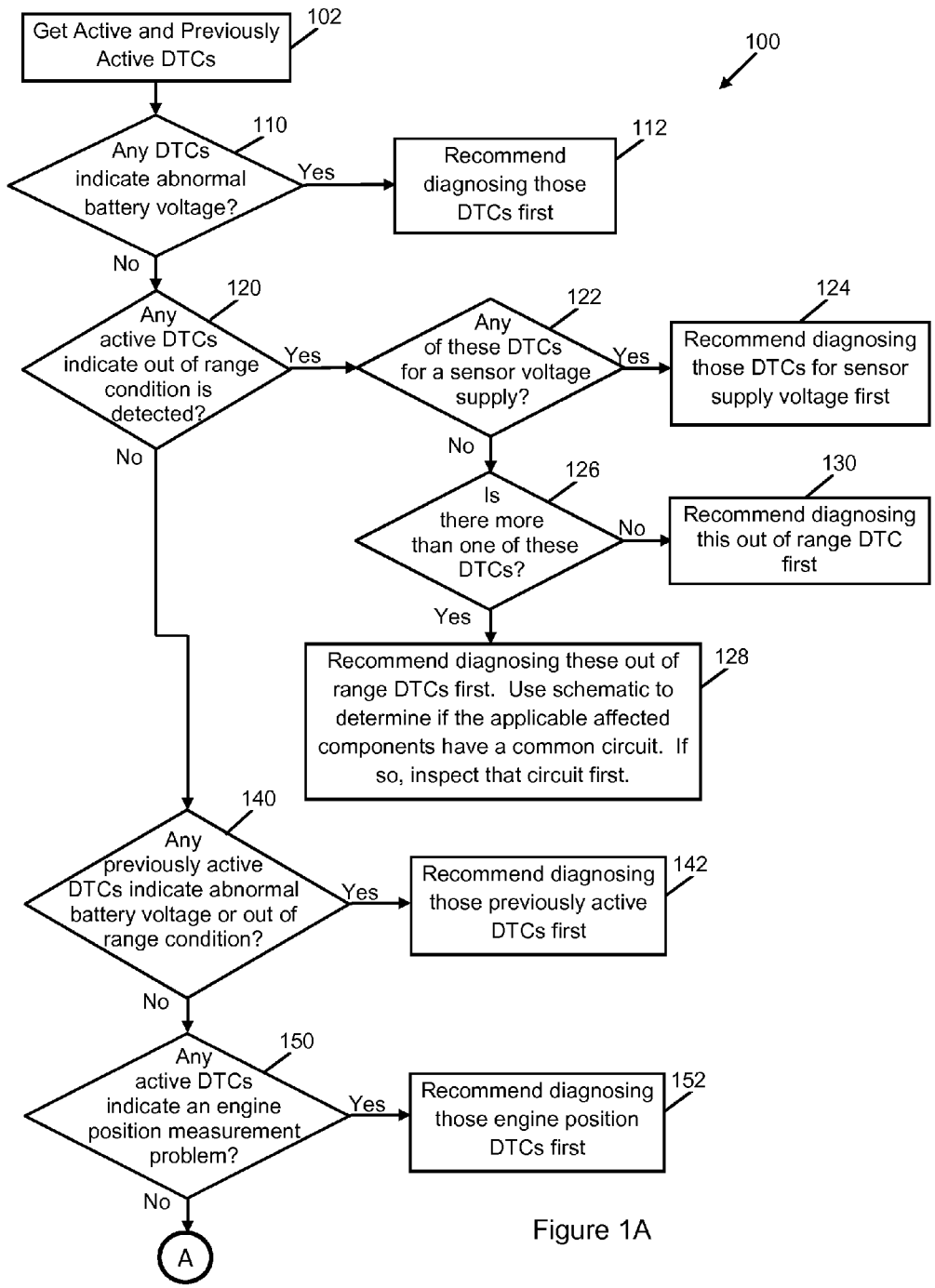
FIG. 1A illustrates a first portion of a control flow for an exemplary DTC sequencer system.

Complex systems such as an electronically controlled diesel engine can utilize diagnostic trouble codes (DTCs) as a means of assisting a service technician in diagnosing a problem. DTCs may also be called fault codes, error codes or other names. It is not uncommon for one failure mode to result in multiple DTCs indicating a root cause problem and one or more symptoms of the root cause problem. A service technician has to decide which DTC to diagnose first when there are multiple DTCs present. If the technician begins the diagnosis of the system by troubleshooting one of the symptom DTCs instead of the root cause DTC, the time and effort required to diagnose the system will be increased.

A DTC sequencer can help the service technician to determine which DTC to diagnose first when there are multiple DTCs present. The DTC sequencer is an interactive service tool and/or process that provides a recommendation to a service technician regarding which DTC to diagnose first when multiple active or previously active DTCs have been logged by an electronic control unit (ECU) or other system. The recommendation can be based on an algorithm that uses a set of fundamental rules; but the logic can be tailored to a specific application to obtain more accurate results. The invention can obtain current DTC status using industry standard methods (e.g., SAE J1939-73, ISO 15765-3) and use this information to return the recommended DTC troubleshooting sequence to reduce diagnostic time and effort. Society of Automotive Engineers (SAE) recommended practice J1939-73 defines a DTC as a suspect parameter number (SPN) and failure mode indicator (FMI). The DTC sequencer can use the SAE J1939 defined FMI as a means of prioritization, or the equivalent for other applications. The SAE J1939 SPN can also be used to prioritize specific systems such as primary battery voltage or those SPNs describing a sensor regulated voltage supply.

For example, at run time, the system can query the ECU regarding DTC active and previously active fault status which can include, for example, SAE J1939-73 DM1, DM2, DM4 or ISO 15765 equivalents. The system can pass the DTC information through a series of steps designed to determine which DTC(s) is likely indicating the root cause of the problem. The system can then provide a recommendation to the technician on which DTC(s) to diagnose first.

The system can be customized or tailored for a specific application. For example, a first engine type may use a common return (ground) circuit for a number of sensors. A failure in the common return circuit may result in voltage out of range DTCs for all applicable sensors. In another engine type, the sensors which use a common return circuit may be different. An external information file unique to the application (engine type in this case) can be utilized at run time based on specific application identification (e.g. engine model number) to provide the technician with a recommendation specific to that application. Additionally, this external file can be updated to permit known issues which are found to result in a combination of seemingly unrelated DTCs to be prioritized according to the learning update.

Figure 1B:
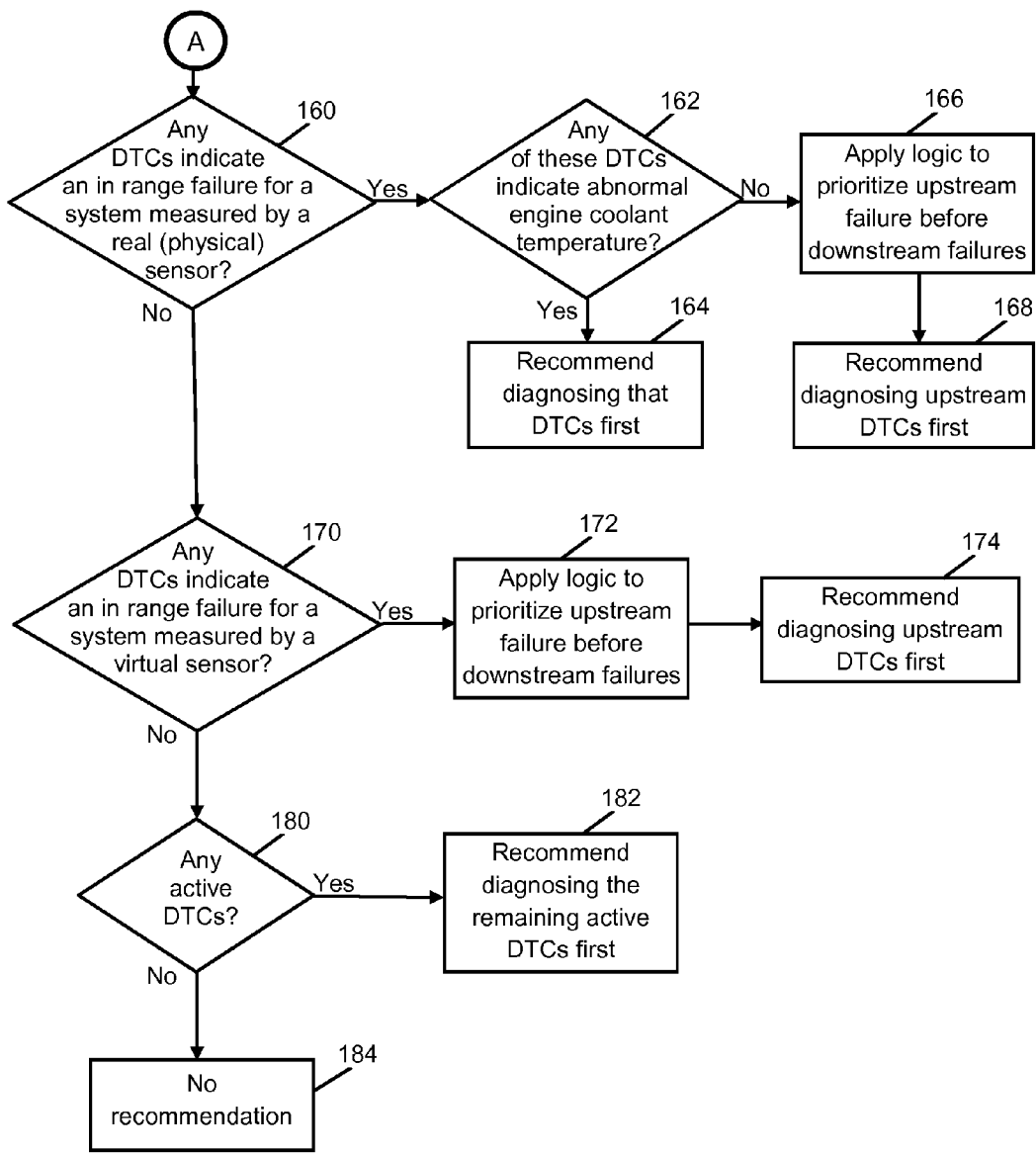
FIG. 1B illustrates a second portion of the control flow for the exemplary DTC sequencer system of FIG. 1A.

FIGS. 1A and 1B illustrate a control flow for an exemplary DTC sequencer 100. At block 102, the DTC sequencer 100 starts by retrieving the active and previously active DTCs from the ECU or other memory device holding the DTCs.

At block 110, the DTC sequencer 100 checks whether any of the active DTCs indicate abnormal battery voltage. If any of the active DTCs indicate abnormal battery voltage then at block 112, the DTC sequencer 100 recommends diagnosing these abnormal battery voltage DTCs first. Otherwise, the DTC sequencer 100 proceeds to block 120.

At block 120, the DTC sequencer 100 checks whether any of the active DTCs indicate detection of an out-of-range condition. If none of the active DTCs indicate detection of an out-of-range condition, the DTC sequencer 100 proceeds to block 140. If any of the active DTCs indicate detection of an out-of-range condition, then at block 122 the DTC sequencer 100 checks if any of these out-of-range condition DTCs are for a sensor voltage supply. If any of these out-of-range condition DTCs are for a sensor voltage supply then at block 124, the DTC sequencer 100 recommends diagnosing the out-of-range condition DTCs for the sensor supply voltage first. At block 126, where at least one active DTC indicates detection of an out-of-range condition and no DTC is for a sensor voltage supply, the DTC sequencer 100 checks if there is more than one DTC fitting this criteria. If there is more than one DTC then at block 128, the DTC sequencer 100 recommends diagnosing these out-of-range DTCs first and if the applicable affected components have a common circuit then inspecting that common circuit first. If there is only one DTC, then at block 130, the DTC sequencer 100 recommends diagnosing this out-of-range DTC first. The technician can use schematics, manuals or other source to determine if multiple affected components have a common circuit. Alternatively, the DTC sequencer 100 could include a database indicating component relationships and flow, and it could use this database to provide a recommendation to the technician on where to start diagnosis when there are more than one out-of-range DTCs.

At block 140, the DTC sequencer 100 checks whether any of the previously active DTCs indicate abnormal battery voltage or out-of-range conditions. If any of the previously active DTCs indicate abnormal battery voltage or out-of-range conditions then at block 142, the DTC sequencer 100 recommends diagnosing these previously active DTCs first. Otherwise, the DTC sequencer 100 proceeds to block 150.

At block 150, the DTC sequencer 100 checks whether any of the active DTCs indicate an engine position measurement problem. If any of the active DTCs indicate an engine position measurement problem then at block 152, the DTC sequencer 100 recommends diagnosing these engine position DTCs first. Otherwise, the DTC sequencer 100 proceeds to block 160.

At block 160, the DTC sequencer 100 checks whether any DTCs indicate an in-range failure for a system measured by a real (physical) sensor. If none of the DTCs indicate an in-range failure for a system measured by a physical sensor, the DTC sequencer 100 proceeds to block 170. If any of the DTCs indicate an in-range failure for a system measured by a physical sensor then at block 162, the DTC sequencer 100 checks whether any of these physical sensor DTCs indicate abnormal engine coolant temperature. If any of these physical sensor DTCs indicate abnormal engine coolant temperature then at block 164, the DTC sequencer 100 recommends diagnosing these DTCs first. If none of these physical sensor DTCs indicate abnormal engine coolant temperature then at block 166, the DTC sequencer 100 prioritizes upstream failures before downstream failures and at block 168, the DTC sequencer 100 recommends diagnosing upstream DTCs first. For example, the low pressure fuel system supplies the high pressure fuel system, so block 166 would prioritize the upstream low pressure fuel system and block 168 would recommend diagnosing the upstream low pressure fuel system DTCs before any downstream high pressure fuel system DTCs. The DTC sequencer can use a common or application specific database to determine upstream versus downstream relationships for system components.

At block 170, the DTC sequencer 100 checks whether any DTCs indicate an in-range failure for a system measured by a virtual sensor. Virtual sensors are modeled values based upon a variety of real sensors, thus the virtual sensor DTCs are checked after it is confirmed that there are no real sensor DTCs. If any of these virtual sensor DTCs indicate an in-range failure for a system measured by a virtual sensor then at block 172, the DTC sequencer 100 prioritizes upstream failures before downstream failures and at block 174, the DTC sequencer 100 recommends diagnosing upstream virtual sensor DTCs first.

At block 180, the DTC sequencer 100 checks whether there are any active DTCs remaining. If there are any active DTCs remaining then at block 182, the DTC sequencer 100 recommends diagnosing the remaining active DTCs first. Otherwise at block 184, where there are no active DTCs remaining, the DTC sequencer 100 makes no recommendation.

In the embodiment illustrated in FIG. 1, the DTC sequencer returns a category with one or more DTCs to diagnose first based on the ending block of the branch where processing ends. The ending blocks include block 112 which returns a category of abnormal battery voltage DTCs, block 124 which returns a category of active out-of-range DTCs for the sensor supply voltage, blocks 128 and 130 which return a category of other active out-of-range DTCs, block 142 which returns a category of previously active abnormal battery voltage or out-of-range DTCs, block 152 which returns a category of engine position DTCs, block 164 which returns a category of abnormal engine coolant temperature DTCs, block 168 which returns a category of other real sensor DTCs, block 174 which returns a category of virtual sensor DTCs, and block 182 which returns a category of remaining active DTCs. In addition, some of the blocks, for example blocks 128, 168 and 174, return a prioritized list of DTCs within the category.

In an alternative embodiment, the DTC sequencer returns a prioritized list of the multiple input DTCs broken down into the above categories. This can be done by simply reconnecting each branch ending block back with the main control flow. For example, connecting control flow from block 112 to block 120; from blocks 124, 128 and 130 to block 140; from block 142 to block 150; from block 152 to block 160; from blocks 164 and 168 to block 170; and from block 174 to block 180. The recommendation would be to diagnose the DTCs starting in the first category and working down through the categories.

Figure 2:
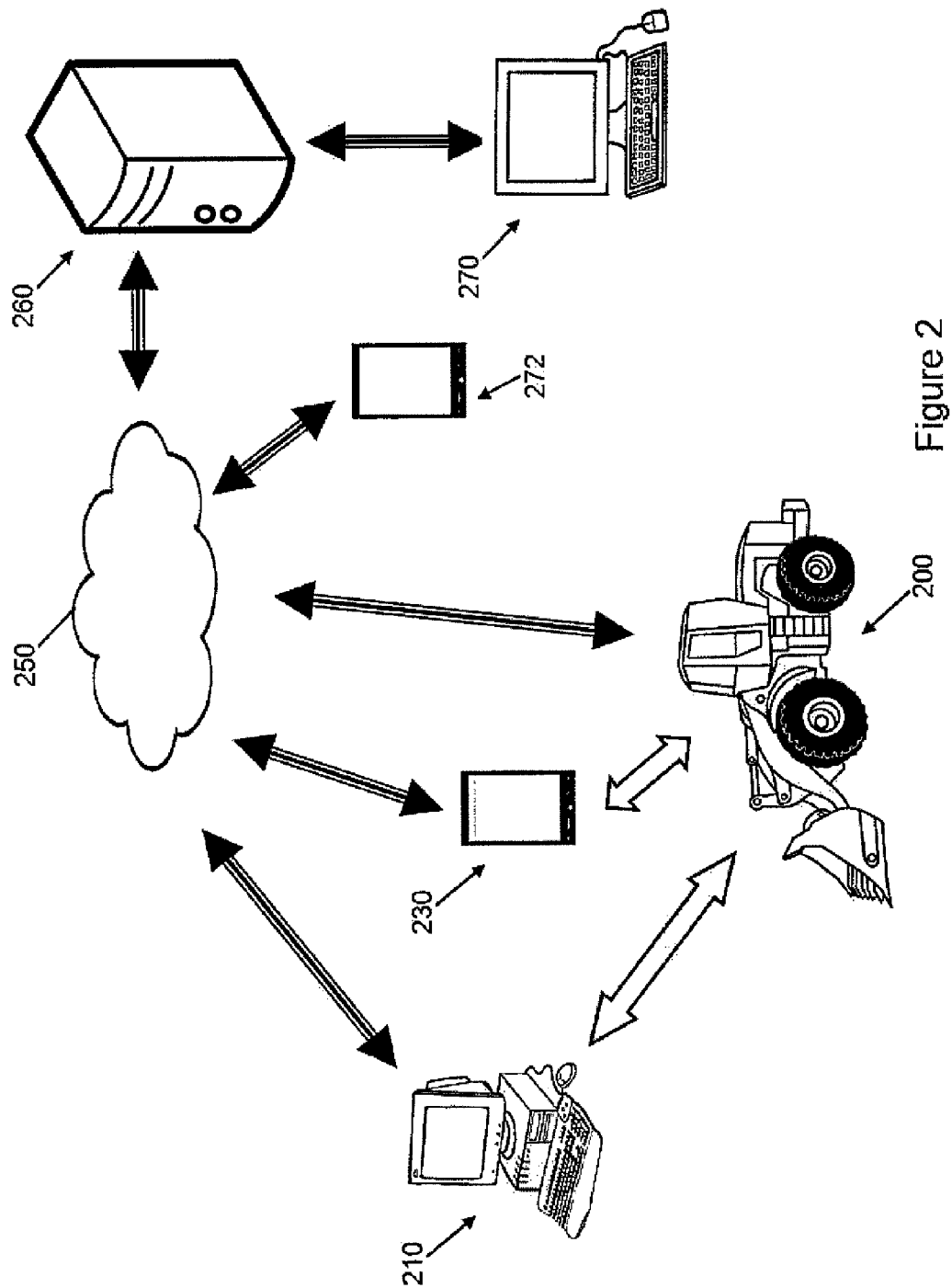
FIG. 2 illustrates various alternative example environments in which a DTC sequencer could operate.

FIG. 2 illustrates various alternative example environments in which a DTC sequencer could operate. A machine 200 can be connected, wired or wirelessly, to an electronic device, for example a computer 210 or a tablet 230. The DTC sequencer can run as part of an electronic service tool in the repair facility on the electronic device, computer 210 or tablet 230.

In an alternative embodiment, a service technician in the field can connect a service tool, for example the tablet 230, to gather the current DTC information from the machine 200 and upload this information over a network 250 to a DTC sequencer on a remotely connected computer 260. The DTC sequencer can determine which DTC(s) to diagnose first and download the resulting recommendation from the computer 260 to the tablet 230 in the field through the network 250. The network 250 can be the Internet, a wide area network, local area network or any other type of network enabling electronic devices to exchange information.

In another embodiment, an on-board telematics device on the machine 200 can monitor DTC status, send the DTC information over the network 250 to a remote system 260 to process the DTC information and derive a diagnostic sequence. The remote system 260 can provide the diagnostic sequence recommendation to a service technician locally on an electronic device 270 or remotely to a remote electronic device 272. Alternatively, the system to process the DTC information and derive the diagnostic sequence could be on the machine 200 (for example, in the ECU) and the machine resident system could provide the diagnostic sequence recommendation to a local or remote service technician through, for example, the electronic device 210, 230 or 272. The DTC sequencer could provide the service technician with a recommendation on which DTC to diagnose first prior to departing to the field, which would enable the technician to bring any parts along on the service call which are necessary to complete the repair, further decreasing diagnostic time and costs.

Any application-specific or common databases used by the DTC sequencer can be locally or remotely accessible by the DTC sequencer system, A DTC sequencer can substantially reduce costs and increase customer machine uptime by quickly directing a service technician to the root cause of a problem. A DTC sequencer is not limited to use with an engine but could be applied to other components or a system of components. For example, a DTC sequencer can be used with an entire vehicle where there are multiple electronic controllers for various subsystems (for example, engines, transmissions, etc.) which set independent DTCs. In some instances, a root cause failure or DTC in one controller (e.g., transmission controller) can cause one or more DTCs not only in that controller, but in other controllers which control other systems (e.g., engine controller). The sequencer can provide recommendations on which DTC to diagnose first from a plurality of controllers which may each have multiple DTCs.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A service diagnostic trouble code sequencing method for a work vehicle, the method comprising:
    acquiring data associated with one or more components of a work vehicle via an electronic control unit (ECU) in communication with the one or more components of the work vehicle, the acquired data including data from one or more sensors in communication with the ECU;
    logging, via the ECU, a plurality of diagnostic trouble codes (DTCs) associated with the acquired data;
    querying, via a processor, the ECU for the logged DTCs;
    determining, via the processor, the logged DTCs related to a first of the components of the work vehicle;
    determining, via the processor, the logged DTCs indicating that a first range condition has been detected for the first component;
    prioritizing the logged DTCs indicating that a first range condition has been detected for the first component as being a higher priority than other DTCs relating to the first component;
    determining, via the processor, the logged DTCs indicating that a first range condition has been detected for the first component which are in an active state; and
    prioritizing, via the processor, the active DTCs indicating that a first range condition has been detected for the first component as being a higher priority than other DTCs indicating that a first range condition has been detected for the first component.

2. The sequencing method of claim 1, further comprising:
    determining, via the processor, the logged DTCs indicating that a second range condition has been detected for the first component; and
    prioritizing the logged DTCs indicating that a first range condition has been detected for the first component as being a higher priority than the DTCs indicating that a second range condition has been detected for the first component.

3. The sequencing method of claim 2, further comprising:
    determining, via the processor, the logged DTCs related to a second of the components of the work vehicle; and
    determining, via the processor, the logged DTCs indicating that a second range condition has been detected for the second component; and
    prioritizing the logged DTCs indicating that a second range condition has been detected for the second component as being a higher priority than other DTCs relating to the second component.

4. The sequencing method of claim 3, further comprising:
    determining, via the processor, the logged DTCs indicating that a first range condition has been detected for the second component which are in an active state; and
    prioritizing, via the processor, the active DTCs indicating that a first range condition has been detected for the second component as being a higher priority than other DTCs indicating that a first range condition has been detected for the second component.

5. The sequencing method of claim 4, further comprising:
    determining, via the processor, the logged DTCs indicating that a second range condition has been detected for the second component; and
    prioritizing the logged DTCs indicating that a second range condition has been detected for the second component as being a higher priority than the DTCs indicating that a second range condition has been detected for the second component.

6. The sequencing method of claim 5, wherein the first range condition is an out of range failure condition and the second range condition is an in range failure condition.

7. The sequencing method of claim 6, further comprising:
    determining, via the processor, the logged DTCs indicating an in range failure condition determined by a virtual sensor.

8. The sequencing method of claim 7, wherein, when multiple of the logged DTCs indicating in range failure conditions are for a common path with flow from upstream to downstream, the prioritizing step includes prioritizing the DTCs from upstream failure DTCs to downstream failure DTCs.

9. The sequencing method of claim 3, further comprising:
    categorizing, via the processor, the logged DTCs based on their relation to the first component and the second component; and
    prioritizing, via the processor, a first category of logged DTCs relating to the first component as being a higher priority than a second category of logged DTCs relating to the second component.

10. The sequencing method of claim 1, further comprising:
    outputting to a display, via the processor, a recommendation to diagnose first one or more of the active DTCs indicating that a first range condition has been detected for the first component.

11. The sequencing method of claim 1, wherein the one or more components of the work vehicle include an engine.

12. The sequencing method of claim 11, wherein the one or more components of the work vehicle include a battery coupled to the engine.

* * * * *